United States Patent [19]
Gilberts

[11] 4,158,869
[45] Jun. 19, 1979

[54] LINE PROTECTOR

[75] Inventor: Alexander G. Gilberts, Algonquin, Ill.

[73] Assignee: Reliable Electric Company, Franklin Park, Ill.

[21] Appl. No.: 826,035

[22] Filed: Aug. 19, 1977

[51] Int. Cl.$^2$ .............................................. H02H 3/22

[52] U.S. Cl. .................................... 361/118; 361/119; 337/32; 337/33; 361/120; 361/124

[58] Field of Search ............... 361/124, 120, 117, 118, 361/119; 337/32, 33, 31, 34, 15, 28

[56] References Cited

U.S. PATENT DOCUMENTS

| | | | |
|---|---|---|---|
| 2,430,206 | 11/1947 | Beck et al. | 361/124 X |
| 3,569,786 | 3/1971 | Kunugi | 361/120 X |
| 3,651,440 | 3/1972 | Bahr et al. | 361/124 X |
| 3,755,715 | 8/1973 | Klayum et al. | 361/124 X |
| 4,002,952 | 1/1977 | Menninga | 361/124 |

*Primary Examiner*—Patrick R. Salce
*Attorney, Agent, or Firm*—Trexler, Wolters, Bushnell & Fosse, Ltd.

[57] ABSTRACT

A line protector for protecting telephone lines and the like from over-voltage or over-current conditions includes a primary arrester element and a secondary arrester element that provides back-up protection upon a fail open of the primary arrester element. The primary arrester comprises a gas tube having spaced electrodes to form an arc gap therebetween. The secondary arrester includes a pair of electrodes axially aligned with the gas tube and separated by an insulating spacer to provide an air gap therebetween. The air gap of the secondary arrester is maintained at a predetermined spacing such that the breakdown voltage thereof is greater than the rated breakdown voltage across the arc gap of the gas tube but less than the breakdown voltage across said arc gap should the gas tube fail open as by being vented to atmosphere.

9 Claims, 3 Drawing Figures

LINE PROTECTOR

BACKGROUND OF THE INVENTION

This invention relates to improvements in line protectors of the type used for protecting telephone lines and other communication lines from over-voltage conditions.

More particularly, the present invention is concerned with protectors of the type intended for protection of wire conductors and equipment connected thereto from electrical over-voltage and over-current conditions which may result from electrical power surges, lightning, and the like. One such protector known in the art includes an arrester comprising a cold cathode gas discharge tube commonly called a gas tube. A gas tube arrester generally comprises a pair of electrodes spaced apart by an insulator to form an arc gap therebetween, and sealed so that the arc gap may be filled with a gas, e.g. argon gas. It is known in protectors of this type to provide a "fail-safe" operation, that is, the protector provides a direct metallic current path from the line to ground in the event of an over-current condition which would tend to damage the gas tube arrester. However, gas tube arresters of this type also tend to fail in an open or high voltage condition. By this is meant that the gas tube fails to discharge at its rated voltage so as to ground the line in response to an over-voltage thereon at which the arrester is designed to operate. Such a failure is usually due to leakage due to a broken seal or similar damage to the gas tube arrester which allows the gas to escape therefrom. It will be appreciated that a gas tube arrester which has failed in this fashion is difficult to detect, as the line to which it is connected continues to operate properly. It will further be appreciated that it is most difficult and expensive to check individual gas tube arresters for a fail open condition, since such arresters are commonly used in large numbers and at a plurality of locations.

Thus, it is desirable to provide an improved gas tube arrester-type protector including means for providing "back up" line protection in the event the gas tube arrester fails open. One such arrangement known in the prior art and shown in Menninga U.S. Pat. No. 4,002,952, issued Jan. 11, 1977, comprises a protector including a gas tube-type arrester electrically connected in parallel with a carbon air gap-type arrester. In this arrangement, then, the carbon air gap arrester tends to continue to provide line protection over a relatively high number of over-voltages or the like, after failure of the gas tube arrester. In contrast, it is desirable to provide a secondary arrester or the like, adapted to fail to ground fairly rapidly upon failure of the gas tube arrester, and preferably upon the first over-voltage condition on the associated line following such failure. It will be appreciated that such a rapid failure to ground of the secondary arrester provides a prompt and positive indication of the failure of the gas tube arrester, whereupon the gas tube arrester may be promptly replaced. The prior art arrangement also suffers from the disadvantage that a specially designed, non-standard type of gas tube arrester is required therein, to fit, together with the carbon air gap arrester, in a standard protector receptacle, thus increasing the expense of providing such a protector unit.

OBJECTS AND SUMMARY OF THE INVENTION

Accordingly, it is a general object of this invention to provide an improved line protector utilizing a gas tube arrester, and further adapted to provide a secondary or back-up arrester or the like to assure discharge of over-voltages or the like to ground, in the event of failure of the gas tube arrester.

A more specific object of this invention is to provide an improved line protector of the foregoing type, which is further adapted to fail to ground in the event of failure of the gas tube arrester thereof thus providing a rapid and reliable indication of such failure.

Another object of this invention is to provide an improved line protector in accordance with the foregoing objects, which is further adapted to provide a direct metallic current path from the line to ground, bypassing the arrester or arresters, in the event of an over-current line fault which would tend to damage said arrester or arresters.

A further object of this invention is to provide an improved line protector in accordance with the foregoing objects, which is further adapted to be installed easily in a standard type of protector receptacle.

DETAILED DESCRIPTION

Figure 1:
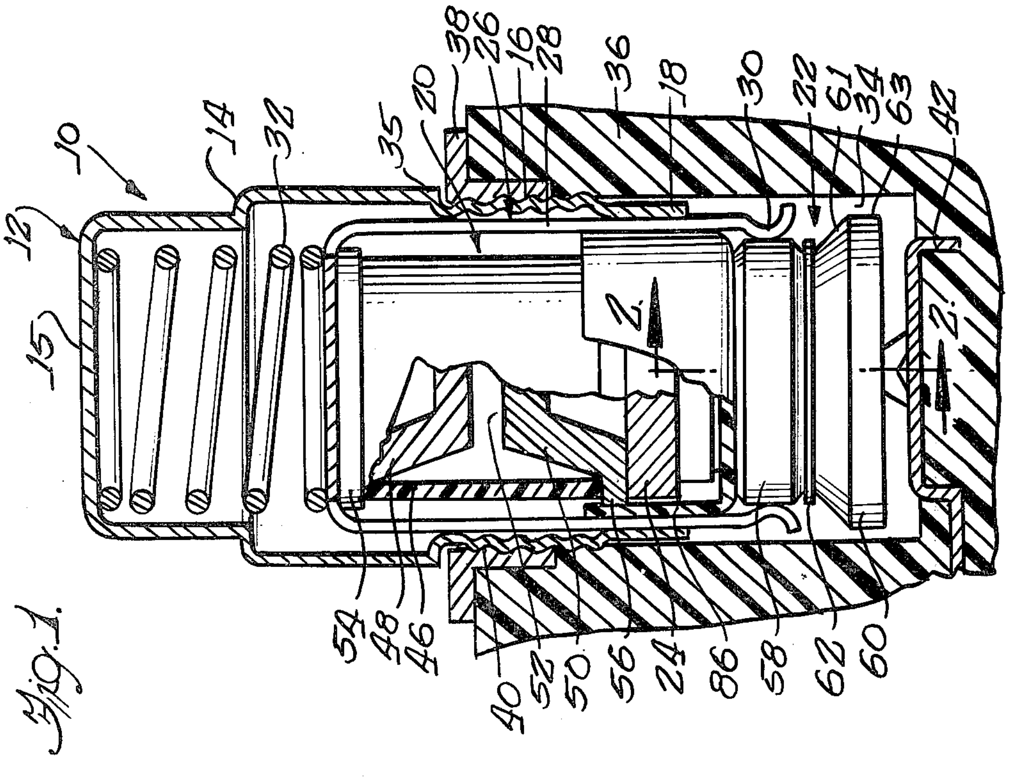
FIG. 1 is a side elevation, partially cut-away and partially in section, of a line protector constructed in accordance with this invention.

Referring now to FIG. 1, a station protector 10 embodying the invention includes a sheet metal housing or cap 12 having an annular radial shoulder 14 that is axially spaced from an end wall 15 of the cap 12. The cap 12 also has a cylindrical wall that is formed with a thread 16 and a depending cylindrical skirt 18 adjacent to and extending axially from the thread 16. The skirt 18 terminates in an open end of the cap 12.

Mounted within the cap 12 is an arrester assembly according to the present invention including a primary arrester 20 comprising a gas tube-type arrester and a secondary arrester 22 comprising an air gap arrester, both of which will be described in further detail hereinbelow. A fusible solder pellet 24, in the form of a generally cylindrical disc, is disposed between the primary and secondary arrester assemblies 20 and 22. The disc 24 and arrester assemblies 20 and 22 are held within the cap 12 by a resilient, generally cup-shaped cage 26 that is telescoped within the skirt 18 and threaded wall 16.

The cage 26 includes a plurality of circumferentially spaced spring-like fingers 28 which are compressed radially inwardly when the cage 26 is inserted within the tubular skirt 18. A lower end of each finger 28 has an inwardly formed tip 30 such that the tips 30 confine and retain the primary arrester assembly 20, the solder pellet 24 and a portion of the secondary arrester assembly 22 within the cage 26 in generally co-axial alignment. Thus, the cage 26 and those parts assembled therewith may be axially inserted as a unit into the skirt 18. A coil compression spring 32 bears at one end on the end wall 15 of the cap 12 and at its opposite end against the flat end of the cage 26.

The protector 10 is adapted to be mounted in a well 34 of a dielectric block or receptacle 36. The receptacle or block 36 is of known construction. Suffice it to say that at the upper end of the well 34 is a metallic contact plate 38 having an internally threaded annular flange 40 for receiving the cap thread 16. The material of the block 36 is also threaded for some distance below the contact plate 38 so that the cap 12 may be threaded into the well 34 until a radial shoulder 35 on the cap abuts the contact plate 38. At the bottom of the well 34 is a metallic contact button 42 that is adapted to engage the end of the protector 10, said end being an end of the secondary arrester assembly 22 thereof. In threading the cap 12 into the block 36 in this fashion, the spring 32 will be compressed somewhat. Thus, the reaction force of the compressed spring 32 maintains the end of the arrester assembly 22 firmly against the contact button 42.

The contact plate 38 and the contact button 42 may be suitably electrically connected to binding posts, clip-type terminals or other terminals (not shown) so that the contact button 42 may be grounded and the plate 38 connected to a telephone line or the like to be protected or vice-versa.

The primary arrester assembly 20 comprises a cold cathode gas discharge tube, of the type generally known in the art. Suffice it to say, that the gas tube 20 comprises a glass or dielectric tubular insulator 46 having opposed, generally concave electrodes 48, 50 bonded to opposite ends thereof, to form a sealed unit. The facing surfaces of the electrodes 48 and 50 are axially spaced apart within the sealed arrester unit 20 to define therebetween an arc gap 52. The electrodes 48, 50 also include conductive rims or flanges 54, 56 which project radially beyond the outer diameter of the insulator 46, to define axially outer contact surfaces of the arrester unit 20. The gas tube arrester 20 may be filled with any suitable inert gas.

Figure 2:
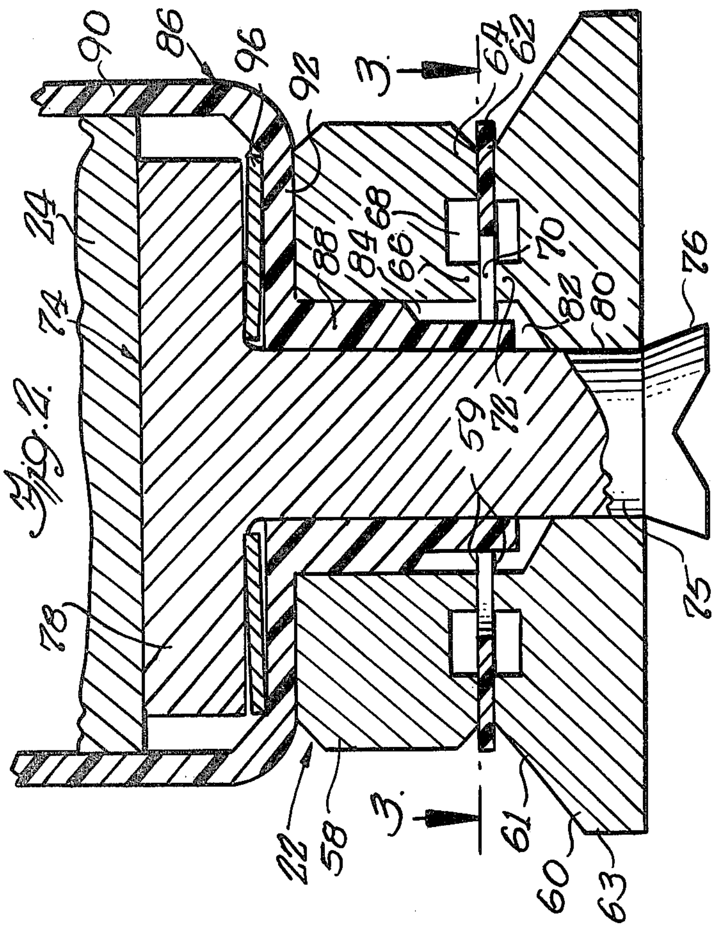
FIG. 2 is a sectional view, somewhat enlarged over FIG. 1, and taken generally along the line 2—2 of FIG. 1.
Figure 3:
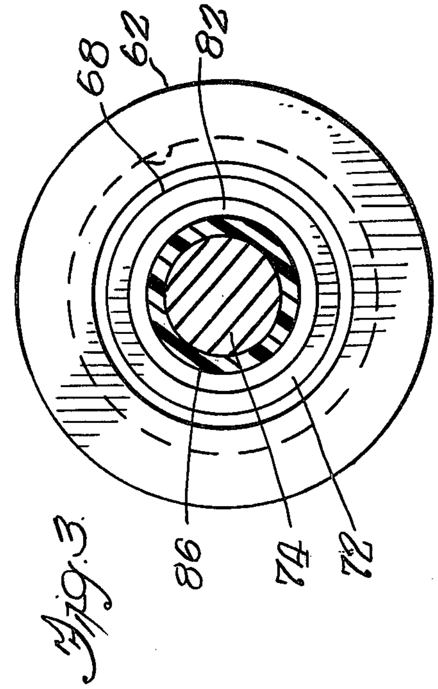
FIG. 3 is a sectional view, somewhat reduced from FIG. 2, and taken generally along the line 3—3 of FIG. 2.

As best seen in FIGS. 2 and 3, the secondary arrester assembly 22 includes a pair of generally annular electrodes 58 and 60, separated by a generally annular dielectric insulating and spacing washer 62. The radially outer surface of the electrode 60 is generally concentric with the radially outer surface of the electrode 60 at opposing faces thereof at the washer 62. However, the outer surface 61 of the electrode 60 slopes radially outwardly axially away from the washer 62, and defines an axially outer cylindrical surface 63 of greater diameter than the outer surface of the electrode 58. The opposing faces 59, 59 of the electrodes 58 and 60, which abut the insulating washer 62, are shaped substantially identically, whereby only the face of the electrode 58 will be described in detail. Said face of the electrode 58 includes a radially outwardly formed annular ridge 64, which abuts the insulating washer 62. A second, similar annular raised ridge portion 66 is formed radially inwardly of the ridge 64, having an axial extent substantially equal to that of the ridge 64 where it abuts the washer 62. The ridges 64 and 66 define between them a generally annular groove or valley 68 which extends axially inwardly of said face of the electrode 58. It will be noted that the inner diameter of the insulating and spacing washer 62 is somewhat larger than the outer diameter of the annular ridge 66, whereby an air filled arc gap 70 is defined between the ridge 66 and a generally concentric facing ridge 72 of the electrode 60. It will be appreciated that the arc gap 70 is substantially annular, the radial dimension thereof being defined by the radial width of the annular ridges 66 and 72. The width of the arc gap 70, between the annular ridges 66, 72, is defined by the thickness of the washer 62. The electrodes 58 and 60 are held firmly abutting the washer 62 as will be hereinafter more fully described.

A generally cylindrical shaft or contactor pin 74 having a stem 75 that extends axially through the central openings 80, 84 of the annular electrodes 58 and 60, one end thereof terminating in a flare or flange 76, which abuts the axially outward face of the electrode 60. The opposite end of the pin 74 terminates in an enlarged diameter generally disc-shaped head portion 78. The diameter of the central opening 80 of the electrode 60 is substantially similar to the outer diameter of the pin 74, whereby the electrode 60 is slidably mounted thereon. The electrode 60 is provided with a substantially annular valley 82, formed radially inwardly of the ridge 72 thereof and extending therefrom to the central opening 80. The electrode 58 has a central opening 84 of generally larger diameter than the central opening 80 of the electrode 60.

An insulating spacer member 86 comprises a generally tubular portion 88 having an outer diameter of substantially similar diameter to the central opening 84 of the electrode 58, and an inner diameter of substantially similar diameter to that of the pin 74. The spacer 86 also includes a cup-shaped portion 90, of substantially larger diameter than the tubular portion 88 thereof and a connecting, generally annular wall portion 92 joining the portions 88 and 90 thereof. As best seen in FIG. 2, the spacing member 86 is positioned such that the tubular portion 88 thereof is interposed between the pin 74 and the annular electrode 58. The connecting annular wall portion 92 abuts the axially outward surface of the electrode 58, and the cup-shaped portion 90 is spaced radially outwardly from and extending around the pin head portion 78. A suitable tension member 96, such as a conventional washer spring (e.g. a Belleville Spring) is between the head portion 78 and the annular wall portion 92.

The tension member 96 and spacing member 86 cooperate with the pin 74 to hold the washer 62 and the electrodes 58 and 60 substantially in coaxial alignment. The foregoing structure also urges the axially inward faces of the electrodes 58 and 60 into contact with the washer 62 to define and maintain the width of the arc gap 70 therebetween. Thus, the foregoing structure defines the secondary arrester unit 22 as a single unit for assembly with the gas tube 20 and remaining protector elements described above.

As best seen in FIG. 1, the cup portion 90 of the insulating spacer member 86 extends for some distance axially outwardly of the arrester assembly 22. The cup 90 is interposed between the fingers 28 of the cage 26 and the solder disc 24 and rim or flange portion 56 of the gas tube arrester 20, and acts as an insulator therebetween. The cup portion 90 surroundingly engages the disc 24 and flange 56 so that the gas tube arrester 20 and secondary arrester assembly 22 are held substantially in coaxial alignment. Also as seen in FIG. 1, the bottom edge of the flare 76 of the pin 74 abuts the contact button 42, the pin 74 being of electrically conductive material, to form an electrical connection therebetween. The flare 76 is advantageously formed following assembly of the pin 74 with the electrodes 58 and 60, the washer 62, tension member 96 and spacing member 86, in such a way as to hold the tension member 96 somewhat compressed to define and maintain the arc gap 70.

As best seen in FIG. 1, the cage 26 is in electrical contact with the contact plate 38 via the cap 12. The cage 26 is also in electrical contact with the electrode 48 of the gas tube 20 via the rim or flange 54 thereof, and with the outer diameter of the electrode 58, via the inwardly formed tips 30. The contact button 42 is in electrical contact with the electrode 60 of the secondary arrester 22 via the shaft or pin 74, and with the electrode 50 of the gas tube arrester 20 via the rim or flange 56 thereof, the solder disc 24 and the head 78. Thus, the gas tube arrester 20 and secondary arrester unit 22 are connected electrically in parallel between the contact plate 38 and contact button 42. The width of the arc gap 70 between the electrodes 58 and 60 of the secondary arrester 22, is such that the breakdown voltage of the arrester 22 is somewhat greater than that of the gas tube arrester 20. Thus, when the gas tube arrester 20 is operating properly, an over-voltage on the line to be protected will result in firing or discharge of the gas tube arrester 20 only, the second arrester 22 never firing or discharging in the presence of a properly operating gas tube arrester 20. When the voltage on the line to be protected reaches the breakdown voltage of the gas tube arrester 20, the gas tube 20 will discharge, causing the line to be grounded. Under these conditions, the gas tube arrester 20 is self-restoring, so nothing need be done to place it in condition for repeated grounding of the line, as necessitated by subsequent over-voltage conditions. However, when an over-current occurs on the line, as for example due to a prolonged voltage above the arcing voltage of the gas tube arrester 20, the protector 10 provides another protection mechanism. The current through the protector 10 will cause the solder disc 24 to melt. This will allow the spring 32 to urge the cage 26 downwardly so that the inwardly formed tips 30 of the fingers 26 thereof come into contact with the outer edge surfaces 61 and/or 63 of the electrode 60, which is in direct metallic contact with the contact button 42, via the pin 74. Thus, the over-current is shunted by direct metallic contact to ground. The protector is, of course, not self-restoring in this mode of operation.

In the event the gas tube arrester 20 fails in an open or high-voltage condition as described above, the arc gap 70 of the secondary arrester 22 will come into operation. In a preferred embodiment, the arc gap 70 is sufficiently narrow so that when the gas tube 20 fails open, a subsequent potentially damaging over-voltage condition on the line will cause the electrodes 58 and 60 to come into direct conductive contact across the arc gap 70, thus permanently grounding the line to be protected. Also, in a preferred embodiment, the electrodes 58 and 60 are composed of a metallic material, such that the application of such an over-voltage thereto will cause the electrodes 58, 60 to fuse or melt resulting in the described direct conductive contact therebetween, closing or shorting the arc gap 70. This structure is such that the foregoing will preferably occur upon the first potentially damaging over-voltage condition following fail-open of the gas tube 20. However, in practice one or more additional such over-voltage conditions may be required. In any case, the line to be protected will be permanently shorted to ground, providing a prompt and unmistakable indication of the failure of the gas tube arrester 20, and indicating the need for a replacement gas tube and secondary arrester unit. It will be noted that the above-described over-current protection mechanism, including the melting of the solder disc 24, is equally applicable to the secondary arrester 22 when the gas tube arrester 20 has failed. The solder disc 24 is also in direct metallic contact with the secondary arrester 22 via the electrode 60 thereof and the pin 74.

While the invention has been shown and described herein embodied in a station protector, the invention is not limited thereto. The arrangement of a primary and a secondary arrester unit according to the invention may, with some modifications, also be embodied in a central office protector.

The invention is claimed as follows:

1. A line protector comprising a tubular cap, a metallic cage telescoped within the cap coaxial therewith and being axially slidable relative thereto, said cage comprising an end wall and a series of axially extending circumferentially spaced fingers projecting from the periphery of said end wall, a sealed cold cathode gas tube having axially spaced electrodes separated by a dielectric tubular insulator and so joined thereto as to form a sealed gas filled arc gap within the gas tube, said electrodes also having exposed conductive electrode flanges at the opposite ends of the tubular insulator, said gas tube being within said cage and substantially coaxial therewith and providing a primary surge arrester, one electrode flange being in conductive connection with said cage, a secondary surge arrester including a pair of annular electrodes substantially axially aligned with the gas tube, means insulating said annular electrodes from each other and including a spacer that separates the annular electrodes to provide an air gap, a first one of said annular electrodes being in conductive contact with said fingers of said cage, a contactor in conductive contact with the other of said annular electrodes, and with the other of said gas tube electrode flanges, whereby said primary and secondary arresters are electrically in parallel, said contactor passing through both of said annular electrodes, and means maintaining said air gap at a predetermined spacing such that the breakdown voltage across the air gap is greater than the breakdown voltage across the arc gap of the gas tube but less than the breakdown voltage across such arc gap if the gas tube seal fails and the arc gap thereof becomes exposed to ambient atmosphere.

2. A line protector according to claim 1 in which said annular electrodes each have facing annular grooves, and said insulating spacer extends radially into the region between said facing grooves, to define said air gap radially inwardly of said grooves.

3. A line protector according to claim 1 in which said contactor has a first end in conductive contact with said other one of said annular electrodes, a second end conductively connected with said other gas tube electrode flange, and a stem connecting said ends that runs coaxially through both annular electrodes.

4. A line protector according to claim 3 wherein said air gap spacing and maintaining means includes a washer-spring interposed between said contactor and said annular electrodes, said contactor including means for holding said washer spring to bear against said annular electrodes.

5. A line protector according to claim 1 in which means maintaining said air gap is so arranged that said secondary arrester electrodes tend to come into direct conductive contact across said air gap in response to said failure of said gas tube seal and said application of said breakdown voltage across said air gap.

6. A line protector according to claim 5 wherein said secondary arrester electrodes comprise a metallic material, such that the electrodes tend to fuse across said air gap to make said conductive contact in response to said application of said breakdown voltage thereto following said gas tube seal failure.

7. A line protector having a primary surge arrester of the cold cathode gas tube type and a secondary surge arrester of the air gap type, the breakdown voltage of the secondary arrester being greater than the breakdown voltage of the primary arrester, said arresters being housed together and being connected to form parallel electric circuits from a line to be protected to ground, said secondary arrester having its air gap defined by two facing electrodes separated by an insulator, a contactor projecting through both facing electrodes and normally being in electrical contact with only one of said electrodes, and means including a spring interposed between the contactor and one of said electrodes for drawing said facing electrodes tightly against said insulator to establish and maintain the magnitude of said air gap.

8. A line protector according to claim 7 wherein the magnitude of said air gap is such that said application of said secondary arrester breakdown voltage thereto when said gas tube has failed open, tends to cause direct conductive contact between said secondary arrester electrodes, closing said air gap.

9. A line protector comprising a tubular cap, a metallic cage telescoped within the cap coaxial therewith and being axially slidable relative thereto, said cage comprising an end wall and a series of axially extending circumferentially spaced fingers projecting from the periphery of said end wall, a primary surge arrester having axially spaced electrodes separated by a dielectric insulator to form an arc gap between the electrodes, said primary surge arrester being within said cage and substantially coaxial therewith, one electrode thereof being in conductive connection with said cage, a secondary surge arrester including a pair of annular electrodes substantially coaxially aligned with the primary arrester, means insulating said annular electrodes from each other and including a spacer that separates the annular electrodes to provide an air gap, a first one of said annular electrodes being in conductive contact with said fingers of said cage, a contactor in conductive connection with the other of said annular electrodes, the contactor also being in conductive connection with other of said primary surge arrester electrodes whereby said primary and secondary arresters are electrically in parallel, said contactor passing through both of said annular electrodes, and means maintaining said air gap at a predetermined spacing such that the breakdown voltage across the air gap is greater than the breakdown voltage across the arc gap of the primary arrester but less than the breakdown voltage across said arc gap if the primary arrester fails such that the breakdown voltage across its arc gap is substantially increased.

* * * * *